(12) United States Patent
Maier et al.

(10) Patent No.: US 7,829,229 B1
(45) Date of Patent: Nov. 9, 2010

(54) POWER CONTROL FOR HYBRID FUEL CELL SYSTEMS

(75) Inventors: Oliver Maier, Worms (DE); Josef Kallo, Stuttgart (DE)

(73) Assignee: GM Global Technology Operations, Inc., Detroit, MI (US)

( * ) Notice: Subject to any disclaimer, the term of this patent is extended or adjusted under 35 U.S.C. 154(b) by 992 days.

(21) Appl. No.: 11/464,508

(22) Filed: Aug. 15, 2006

(51) Int. Cl.
*H01M 8/04* (2006.01)

(52) U.S. Cl. .................... 429/432; 429/428; 429/430

(58) Field of Classification Search .................... 429/22
See application file for complete search history.

(56) References Cited

U.S. PATENT DOCUMENTS 5,487,956 A * 1/1996 Bromley et al. ............. 320/163
2003/0091882 A1 * 5/2003 Schmidt et al. ............... 429/23
2003/0201674 A1 * 10/2003 Droppo et al. ................ 307/82
2004/0018399 A1 * 1/2004 Jung ............................. 429/9
2007/0284166 A1 * 12/2007 Maier et al. ................ 180/65.3

* cited by examiner

*Primary Examiner*—Dah-Wei D. Yuan
*Assistant Examiner*—Patricia Davis
(74) *Attorney, Agent, or Firm*—John A. Miller; Miller IP Group, PLC

(57) ABSTRACT

A hybrid fuel cell system that includes a fuel cell stack and a high voltage battery. The fuel cell system also includes a cell voltage controller that controls the average cell voltage of the cells in the fuel cell stack, a damped driver request module that damps a driver power request signal, and a power balancing module. The power balancing module maintains the cell voltage of the cells in the stack within a predetermined range, and uses excess power from the stack beyond what is requested to charge the battery. The power balancing module includes a base load limiter that prevents the cell voltage from going above a predetermined value, unless the battery is at is maximum state of charge.

14 Claims, 2 Drawing Sheets

POWER CONTROL FOR HYBRID FUEL CELL SYSTEMS

BACKGROUND OF THE INVENTION

1. Field of the Invention

This invention relates generally to a hybrid fuel cell system and, more particularly, to a hybrid fuel cell system that employs a cell voltage controller, a damped driver power request module and a power balancing module for balancing the power between a battery and a fuel cell stack in the system to provide stack durability.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of the vehicle may not be acceptable. During a drive cycle, the stack cell voltage varies because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

FIG. 1 is a schematic block diagram of a fuel cell system 10 including a fuel cell stack 12 and a battery 14 that includes power electronics. In order to provide battery charge or discharge, a voltage difference is needed between the stack voltage and the battery voltage that is greater than or equal to the battery charge. When the stack voltage is greater than the battery voltage, the power electronics operates as a voltage amplifier where the gain is less than or equal to one. The fuel cell stack 12 provides electrical power to a high voltage bus line, represented here as positive bus line 16 and negative bus line 18. In a vehicle fuel cell system, the fuel cell stack 12 may include about 400 fuel cells. The battery 14 is also coupled to the high voltage bus lines 16 and 18, and provides supplemental power as discussed above.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14. A blocking diode (not shown) prevents the regenerative electrical energy applied to the bus lines 16 and 18 from flowing into the fuel cell stack 12, which could otherwise damage the stack 12.

It is known to maintain the output power of the stack within a desirable voltage range for as long as possible in order to increase fuel cell stack durability in a hybrid fuel cell system. For example, it is desirable to maintain a cell voltage for each fuel cell in the stack in the range of 0.725-0.85 volts. As the load on the fuel cell stack goes up, the cell voltage goes down, and vice versa. It is desirable to prevent each cell voltage from going above 0.85, which would be a very low stack load. Further, if the cell voltage falls below 0.725 volts for high loads, it is desirable to maintain the cell voltages in the high load range as long as possible for stack durability purposes. Also, it is desirable that the battery state of charge (SOC) does not go above its maximum charge limit or below its minimum charge limit.

SUMMARY OF THE INVENTION

In accordance with the teachings of the present invention, a hybrid fuel cell system is disclosed that includes a fuel cell stack and a high voltage battery. The fuel cell system also includes a cell voltage controller that controls the average cell voltage of the cells in the fuel cell stack, a damped driver request module that damps a driver power request signal, and a power balancing module. The power balancing module maintains the cell voltage of the cells in the stack within a predetermined range, and uses excess power from the stack beyond what is requested to charge the battery. The power balancing module includes a base load limiter that prevents the cell voltage from going above a predetermined value, unless the battery is at its maximum state of charge.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a control scheme for controlling fuel cell stack power and battery power in a hybrid fuel cell system is merely exemplary in nature, and is no way intended to limit the invention or its applications or uses.

Figure 1:
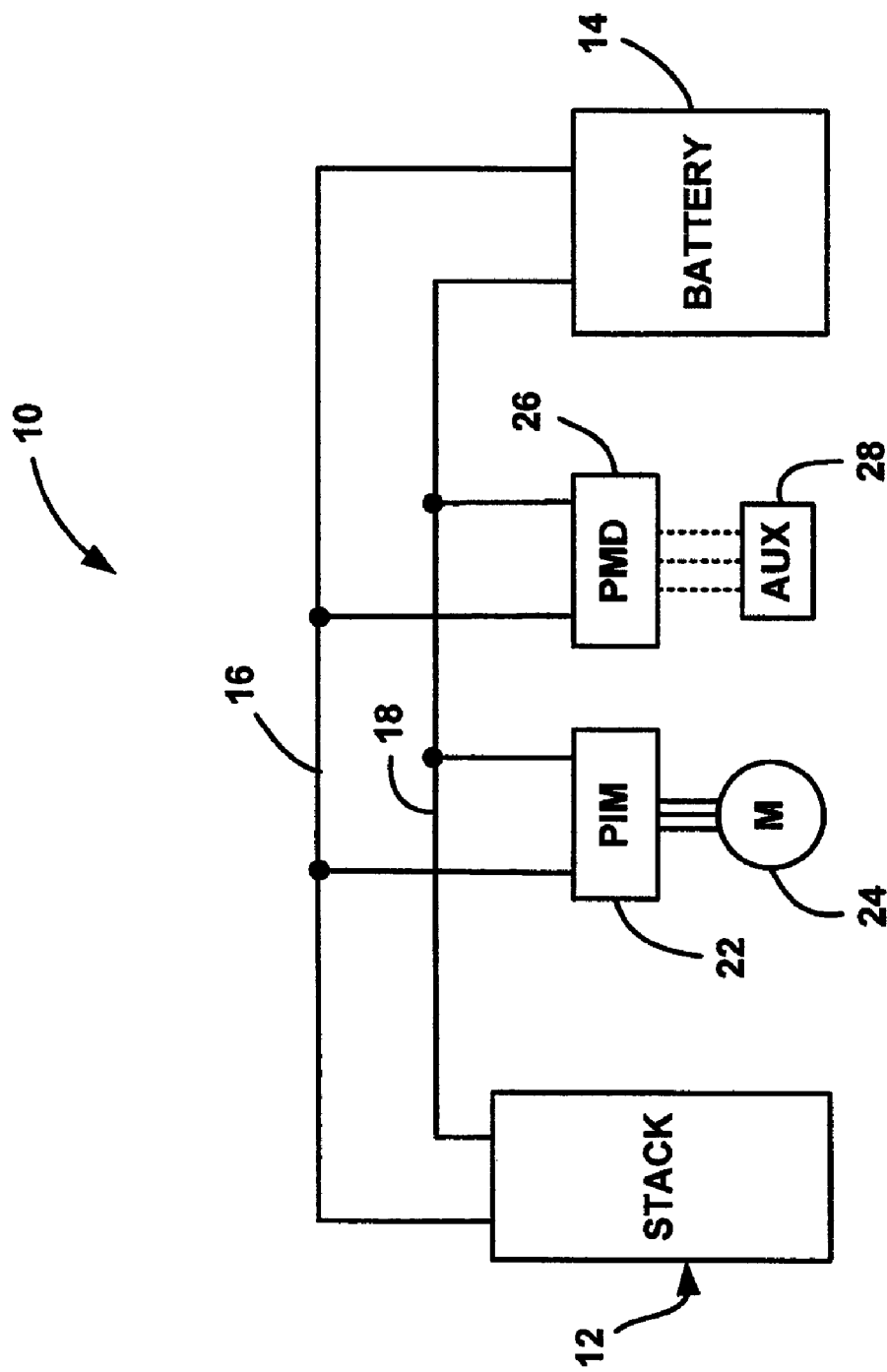
FIG. 1 is a schematic block diagram of a hybrid fuel cell system including a fuel cell stack and a high voltage battery.
Figure 2:
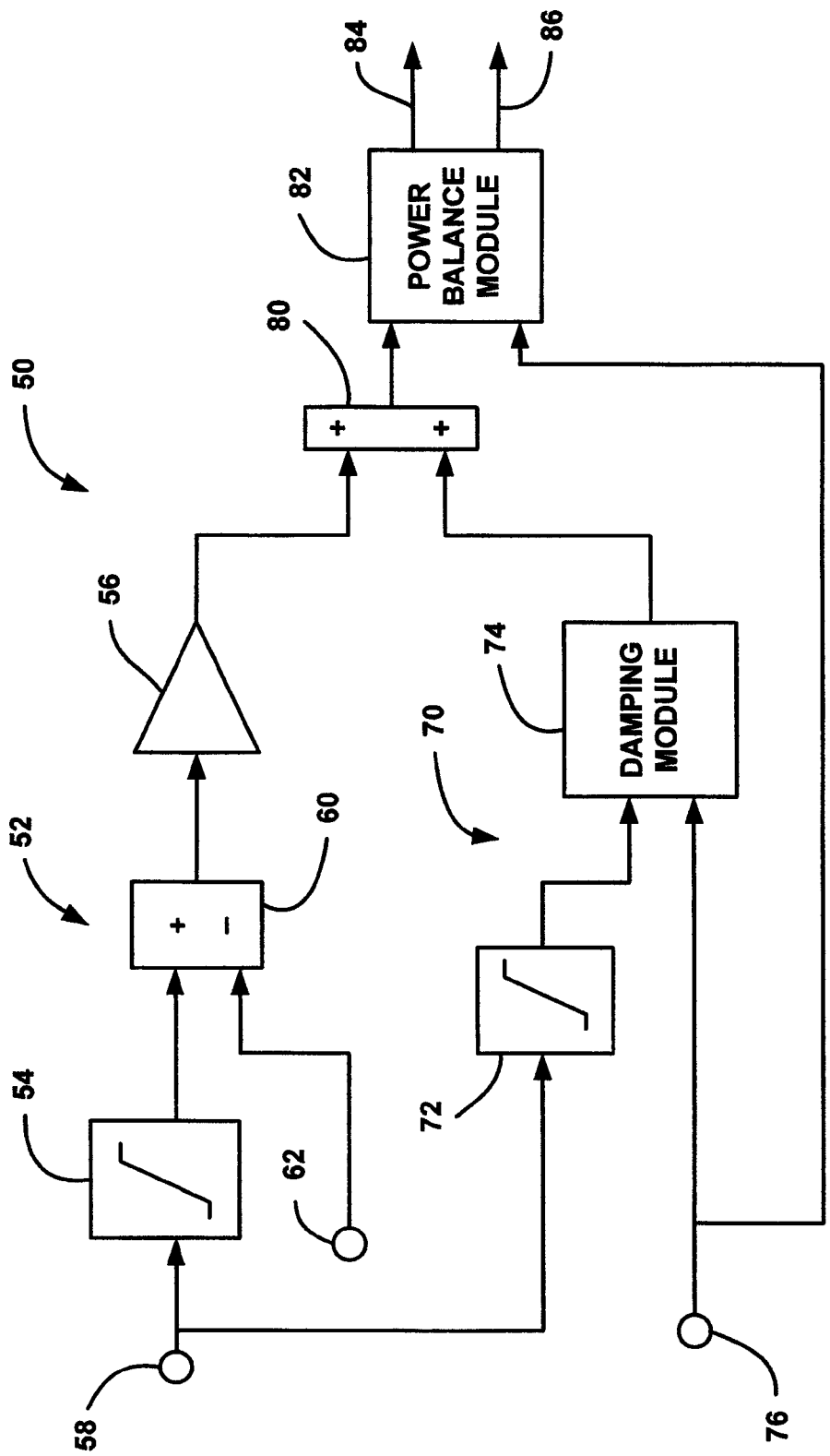
FIG. 2 is a block diagram of a control system for the fuel cell system shown in FIG. 1, according to an embodiment of the present invention.

FIG. 2 is a block diagram of a control system 50 for a hybrid fuel cell system, such as the system 10, according to an embodiment of the present invention. The control system 50 includes a fuel cell voltage controller 52 including a look-up table 54 and a proportional controller 56. The look-up table 54 provides a fuel cell voltage set-point within a predetermined range depending on the SOC of the battery 14 provided at node 58. For example, if the battery SOC is high, near its maximum level, then the look-up table 54 will provide a cell voltage set-point at the high end of the predetermined range, for example, 0.85 volts. Likewise, if the battery SOC is low, near its minimum level, then the look-up table 54 will provide a cell voltage set-point at the low end of the predetermined range, for example, 0.725 volts. Therefore, the cell voltage set-point determines how much of the battery power will be used based on its SOC, where more battery power is used to operate the vehicle for a high battery SOC and more fuel cell stack power is used to charge the battery 14 at a low battery SOC. The output of the look-up table 54 is sent to a subtractor 60 that subtracts the set-point from the actual cell voltages at node 62. The subtracted cell voltage signal is then processed by the proportional controller 56 to provide a desired power gain signal.

The control system 50 also includes a damped driver power request controller 70. The battery SOC signal at node 58 is applied to a look-up table 72 for reasons that will be discussed below. The output of the look-up table 72 is applied to a damping filter module 74 that also receives a driver power request signal at node 76. In one embodiment, the damping filter module employs a first order filter. The filter module 74 filters the power request signal from the vehicle operator. If the vehicle operator requests a high power transient, such as 10 kW or more, the filter module 74 damps the request so that the power demand signal to the fuel cell stack 12 will be slower than the power request signal so that the stack power will more slowly increase to the desired power level. The power difference between the operator power request signal and the power provided by the fuel cell stack will be provided by the battery 14, which acts a dynamic buffer. By reducing large changes in the power demand from the fuel cell stack 12, its durability can be increased.

At down transients, the damped fuel cell stack power can be used to charge the battery 14. Particularly, if the vehicle operator requests a low power transient, the filter module 74 damps the requests so that the power demand signal to the fuel cell stack 12 will be higher than the operator power request signal so that the stack power will more slowly decrease to the desired power level. The extra power produced by the fuel cell stack 12 will be used to charge the battery 14.

For some drive cycles, the battery SOC reaches its upper limit as a result of high regeneration power. To prevent the battery SOC from reaching its upper limit, the damping time of the first order filter 74 is related to the battery SOC as provided by the look-up table 72. Particularly, if the battery SOC is at or near its upper limit, the filter module 74 increases the damping time. Therefore, for a high battery SOC, the look-up table 72 will increase the damping time of the first order filter 74 so that more battery power is used during the high power transients to satisfy the power request. The damping time will be reduced as the state of charge of the battery 14 decreases.

The proportional control voltage set-point for the fuel cells from the proportional control 56 is added to the damped power request signal for the stack 12 from the first order filter 74 by an adder 80. The added power request signal for the fuel cell stack 12 from the adder 80 and the driver request signal at node 76 are provided to a power balancing and load base module 82. The module 82 provides a power demand signal for the stack 12 on line 84 and a power demand signal for the battery 14 on line 86. The module 82 determines how much power will be provided by the stack 12 based on the power that the battery 14 is able to provide with reference to the power the driver is requesting. Therefore, because the driver power request will always be met, if possible, the fuel cell stack 12 will provide the difference between the power the driver requests and the power the battery 14 is able to provide.

The module 82 also limits the power request from the stack 12 by a base load value, which prevents the load on the stack 12 from going above 0.85 volts per cell. Therefore, if the driver power request signal is below a predetermined value, such as 4 kW, which would cause the fuel cell voltage to go above 0.85 volts, the fuel cell stack 12 provides output power at the high end of the range, and the extra power beyond the driver request is used to charge the battery 14. If, however, the battery 14 has reached its maximum SOC, then the base load function of the module 82 is shut-off, and the cell voltage is forced to go above 0.85 volts. Thus, the module 82 provides power balancing where the requested battery power is the difference between the driver power request and the stack power request.

The power limitation band of the stack power request can be defined as:

$$P\_FcpmReq = \max(P\_DrvReq - P\_Bat\text{MaxDischarge}, P\_FcpmCtrlOut) \quad (1)$$

$$P\_FcpmReq = \min(PDrvReq + P\_Bat\text{MaxCharge}, P\_FcpmCtrlOut) \quad (2)$$

Where P_FcpmReq is the power requested from the stack 12, P_DrvReq is the power requested by the vehicle operator, P_BatMaxDischarge is the lowest battery SOC, P_BatMaxCharge is the maximum battery SOC, and P_FcpmCtrlOut is the damped fuel cell stack power request from the adder 80.

The function of equations (1) and (2) fulfill the priority of the driver power request, which is relative to the limitation of the vehicle dynamics. After this limitation, the power request limitation to a baseload is implemented if the battery SOC is not at its upper limit. The base load power fulfills the requirement that the cell voltage should be below the upper limit at idle, until the upper limit of the battery SOC is reached.

The control system 50 offers a number of advantages. Particularly, the average cell voltage is controlled to stay as long as possible within the allowed cell voltage range as provided by the cell voltage controller 52. The base load limiter feature of the module 82 avoids high cell voltages by loading the battery 14. The base load power represents the power that is necessary to reach the upper allowed fuel cell voltage limit. Further, transients at stack power are minimized by the operation of the damped power request of the filter module 74, where the high transients are taken over by the battery 14. The filter module 74 also avoids short power peak requests to the fuel cell system 10. The cell voltage controller 52 generates a higher battery charge power by requesting a low cell voltage to avoid the lower limit of the battery SOC. The filter time of the filter module 74 increases for higher damping of the driver power request to avoid the upper limit of the battery SOC.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A hybrid fuel cell system comprising:
a fuel cell stack;
a power source; and
a controller sub-system including a cell voltage controller, a damped driver power request controller and a power balancing and limiting controller, said cell voltage controller including a first look-up table responsive to a power source state of charge signal and providing a cell voltage set-point signal based on the state of charge of the power source, said cell voltage controller further including a subtractor for subtracting the cell voltage set-point signal from an actual cell voltage signal, said cell voltage controller further including a proportional controller responsive to the subtracted signal and providing a proportional cell voltage gain signal, said damped driver power request controller receiving the state of charge signal and a driver power request signal, said damped driver power request controller including a filter that damps the driver power request signal based on the state of charge signal, said controller sub-system adding the damped power request signal and the gain signal, said power balancing and limiting controller being responsive to the added power request and gain signal and the driver power request signal, and setting a power demand signal for the stack and the power source.

2. The system according to claim 1 wherein the damped driver power request controller includes a second look-up table responsive to the state of charge signal, said second look-up table increasing the damping signal if the state of charge signal is near a predetermined upper limit.

3. The system according to claim 1 wherein the power source is a battery.

4. The system according to claim 1 wherein the filter is a first order filter.

5. The system according to claim 1 wherein the power balancing and limitation controller prevents the load on the stack from going above a predetermined volt per cell value.

6. The system according to claim 1 wherein the power balancing and limitation controller provides stack power to charge the battery for low power requests.

7. The system according to claim 1 wherein the power balancing limitation controller maintains the average cell voltage of the cells in the fuel cell stack in the predetermined range.

8. The system according to claim 7 wherein the predetermined range is 0.725-0.85 volts.

9. A fuel cell system comprising:
a fuel cell stack;
a battery; and
a controller sub-system for controlling a power demand signal for the stack and the battery so as to maintain the average cell voltage of the stack within a predetermined range, said controller sub-system damping a driver power request, and using excess power to recharge the battery, wherein the controller sub-system includes a damped driver power request controller responsive to the battery state of charge signal and a driver power request signal, said damped driver power controller including a filter that damps the driver power request signal based on the state of charge signal.

10. The system according to claim 9 wherein the controller sub-system includes a cell-voltage controller having a look-up table responsive to a battery state of charge signal and providing a cell voltage set-point signal based on the state of charge of the battery.

11. The system according to claim 9 wherein the filter is a first order filter.

12. The system according to claim 9 wherein the controller sub-system includes a power balancing and limiting controller responsive to a cell voltage set-point signal and a driver power request signal, said power balancing and limiting controller setting a power demand signal for the stack and the battery.

13. The system according to claim 12 wherein the power balancing and limiting controller prevents the load on the stack from going above a predetermined volt per cell value.

14. The system according to claim 9 wherein the predetermined range is 0.725-0.85 volts.

* * * * *